May 30, 1933. J. H. CALBECK 1,911,604
ELECTROLYTIC PROCESS FOR THE RECOVERY OF LEAD FROM WASTE MATERIALS
Filed Oct. 1, 1928
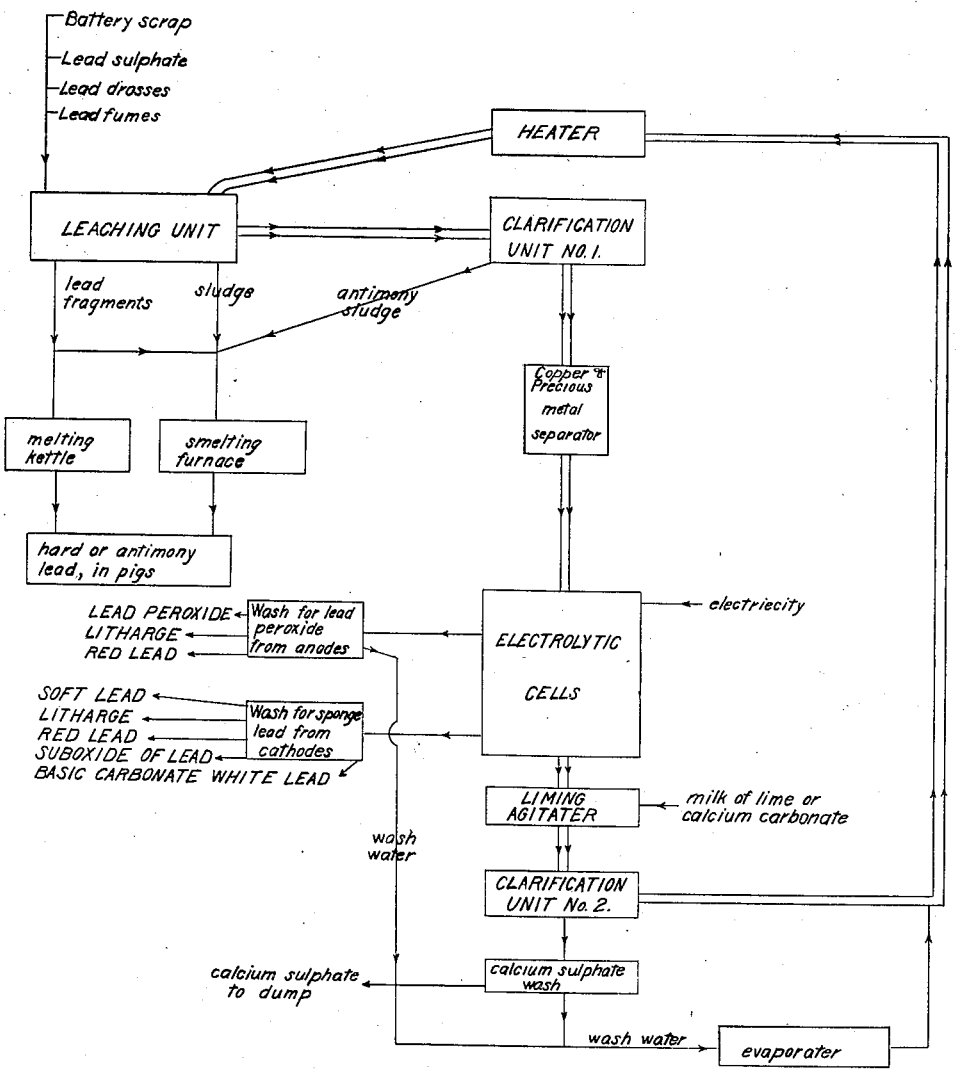
INVENTOR.
John H. Calbeck.
BY
ATTORNEY Patented May 30, 1933

1,911,604

UNITED STATES PATENT OFFICE

JOHN H. CALBECK, OF JOPLIN, MISSOURI

ELECTROLYTIC PROCESS FOR THE RECOVERY OF LEAD FROM WASTE MATERIALS

Application filed October 1, 1928. Serial No. 309,383.

My invention relates to processes for recovering metallic lead and lead compounds from lead bearing materials and particularly to electrolytic processes and electrolytes for recovering metals, the principal object of the invention being to reduce the number of steps necessary for producing relatively pure metallic lead and desired lead compounds from mixed materials.

One of the problems of industry is the recovery of pure lead and desired lead compounds from lead bearing material such as residues from chamber acid plants, fumes from lead furnaces, drosses, lead sulphate prepared by roasting high grade lead ores, lead sulphate residues from lithopone and electrolytic zinc plates, and storage battery scrap.

Processes heretofore used either fail to deliver the lead and lead compounds in desirable form or as in the case of chemical processes are uneconomically expensive.

At the present time practically all the above mentioned materials are treated in fire smelters, the product being an impure lead that has to be refined before it can be used or sold. The disadvantage of smelting lead bearing material may be illustrated by the case of battery scrap. The original plates included grids consisting of antimonial lead containing substantially 7% of antimony and the scrap comprises grid portions and metallic lead fragments deficient in antimony, antimony compounds, lead oxides including lead peroxide, lead sulphate, and metallic impurities.

When spent plates from storage batteries of the lead-acid type are smelted, the metallic lead recovered contains antimony in proportions varying indefinitely from 3% to 3½% and is therefore deficient in antimony for battery grid purposes. The lead must be treated further to condition it for use. The other lead compounds of the scrap are also delivered from the smelter in forms not immediately useable without retreatment.

Some battery scrap is treated to recover the active material and this recovered material is treated by chemical means to convert it into the oxides of lead or other materials for re-use in battery plates. The recovered active material contains from 0.3% to 0.9% antimony compounds as its principal impurity and it is the removal of this impurity that makes for the most trouble and expense and then a product is obtained that is not of equal purity and quality with the oxides of lead prepared from pure pig lead.

The result of troublesome, expensive and relatively inefficient present methods for recovering useful materials from battery scrap is that battery scrap has a relatively low value, and considerable quantities of valuable lead materials are annually thrown away, to be replaced by relatively more expensive products manufactured from virgin metal.

Further objects of my invention therefore are to recover both the depreciated antimonial lead and the separated antimony from battery scrap, and recombine them to form an antimonial lead adapted for use in battery grids, and to produce lead compounds from battery scrap active material in forms in which they will be immediately useable without further conversion, or when converted will comprise compounds having high quality.

Lead peroxide must be reduced to a lower oxide in order to be treated by any of the known processes with the exception of smelting, and battery scrap, which is one of the sources of my products, contains 3 to 10 per cent of lead peroxide. One of the objects of my invention therefore is to provide for the reduction of lead peroxide coincidentally with the recovery of the lower oxides of the leady material.

Electrolytic processes for recovering lead from lead bearing material ordinarily provide for depositing lead on one electrode while gas is evolved at the other electrode.

Another object of my invention therefore is to electrolyze a lead carrying solution between insoluble electrodes for depositing lead values on each electrode, and particularly for depositing metallic lead on one electrode and lead peroxide on the other electrode, whereby electrolysis of the solution will recover lead values in form and purity available for immediate use in storage battery plates or for convenient conversion into desirable products having high quality.

Other objects of the invention will be stated in the course of the description which follows and still others will be indicated in the results stated for the steps of the process.

In accomplishing the objects of my invention and carrying out my process, I may employ apparatus well known in the several industries involved. I therefore do not describe the apparatus in detail. The steps included in selected specific applications of the process are illustrated diagrammatically in the accompanying drawing, wherein each mechanical element may be constructed in accordance with well-known practice.

The invention will first be described in a specific aspect as applied to the treatment of spent plates from storage batteries of the lead-acid type comprising battery scrap, for recovering and producing metallic lead and lead compounds, it being understood that steps of the process described may be omitted and others added suitably to another type of material supplied for treatment, for example, lead bearing materials containing no antimony or sulphates.

A brief summary of the steps of the process as applied to the treatment of battery scrap follows: Leaching out the old active material and part of the metallic lead with a solution including an acetate capable of dissolving lead, lead sulphate and calcium sulphate; removing antimony from the solution; electrolyzing the solution between insoluble electrodes to deposit metallic lead on the cathode and lead peroxide on the anode; treating the resulting solution with a calcium compound such as the hydrate or carbonate to remove a substantial proportion of the sulphate ion; clarifying the solution; heating the solution to from 120° F. to 200° F.; returning the solution to act upon additional scrap; smelting the residues of the leaching with the antimony, and removing the deposits from the electrodes.

The process in a specific aspect will now be described more in detail:

The battery scrap which is to be treated comprises chiefly the grids, small grid wires and fragments consisting of metallic antimonial lead, and the material which had comprised the active material of the plate, the so-called active material comprising lead sulphate, lead peroxide, and other lead oxides.

The first phase of my process consists in the separation of the active material from metallic lead, and the production of an electrolyte including the active material.

A solution is first prepared which is to act as the separating or leaching agent, the principal constituent of the solution being an acetate capable of dissolving certain lead compounds and producing local electrolytic effect later described, namely, an alkali acetate or an alkaline earth acetate.

For treating battery scrap I prefer to prepare a solution containing an alkali acetate, for example, sodium acetate. I prefer to use a solution of sodium acetate of such strength that when saturated with and in the presence of solid lead sulphate and calcium sulphate will have a specific gravity of approximately 1.200.

The battery scrap is separated from refuse such as rubber, wood, iron and similar material and placed in perforated boxes or baskets made of material adapted to resist the solvent action of the electrolyte, for example wood. The baskets are installed in a leaching tank, and the solution is heated to between 120° F. and 200° F. and circulated through the tank. The baskets and material are preferably submerged in the solution which is pumped through the tank with a high degree of agitation and preferably in such a manner as to promote oxidation of the metallic fragments as later described.

The relatively high temperature of the solution promotes its ability to dissolve the leady material with relative rapidity.

The active material is leached out from the grids by the solution until the latter is saturated with reference to lead and sulphate.

Several reactions occur during the leaching step. One of the more important reactions which I have discovered and take advantage of is the result of local electrolysis of metallic lead and lead peroxide. The lead peroxide which is present ordinarily in from 3% to 10% and insoluble in the solution, is in contact with the metallic lead of the old grids and with sponge lead of the old negative plates, and the sodium acetate of the solution comprises an electrolyte through which a local current flows between the metallic lead and the lead peroxide, whereby the peroxide and an equivalent weight of metallic lead are converted to lead acetate. The conversion of metallic lead may be promoted when desired or excess of lead peroxide may be reduced, by supplemental steps later described.

The lead oxides other than the above mentioned peroxide, and the lead sulphate, are dissolved into the solution in the form of lead acetates. The antimony separated from the antimonial lead during the use of the plates comprising 0.3% to 0.9% of the active material of the battery scrap is present in compounds, for example pentoxide or oxysulphate, and largely goes into suspension in the solution and is removed by filtering or other clarification process. Copper and precious metals may be present and may go into the solution in the form of acetates but these metals may plate out on the lead fragments or on sponge lead introduced into the system for that purpose.

The solution containing lead taken up in the leaching step, and compounds of various metals including compounds of iron, nickel and zinc, is then treated to remove the antimony preferably by filtering and the recovered antimony, the sludge from the leaching tank, and the metallic fragments are assembled and treated by smelting to produce antimonial lead.

The copper carried by the solution would plate out on sponge lead produced by a later step, and I therefore provide for its elimination by agitating the solution with sponge lead in a separator, whereby the copper is precipitated out. Precious metals may also be eliminated in the separator provided for the precipitation of the copper. The solution after removal of antimony, copper and precious metals comprises an electrolyte.

The second phase of the process includes electrolytic recovery of lead.

The electrolytic unit may comprise any number of cells and the electrolyte may be circulated over a special circuit independent of the main circuit in which the leaching and other steps are taken.

I have discovered that with the use of my electrolyte provided as described I may employ two insoluble electrodes in each cell and accomplish the deposition of desired products in pure form on both electrodes, without the evolution of gas at either electrode during electrolysis. Increase in temperature of the elements is avoided as one incident of my practice, and no special equipment for cooling is required. The electrodes may be formed of Monel metal.

I prefer to pass a current density through the cells equal to from 20 to 100 amperes per square foot of cathode surface, with a voltage of about two volts, and I prefer to maintain the temperature in the cells at about 120° F.

One advantage of the ability to use insoluble electrodes and deposit lead products on both electrodes is that one ampere hour of electricity is made to deposit twice as much material on the electrodes as other methods for the electrolytic treatment of lead solutions.

Lead peroxide is deposited on the anode and metallic lead on the cathode. The metallic lead is of a spongy nature and its physical properties are controlled by conditions of temperature, concentration and current density.

While not intending to set forth all of the reactions occurring during electrolysis, nor the exact nature of substances present at any stage, it is my belief that the lead present in the electrolyte at the beginning of the electrolytic step is in the form of lead acetate so that the bringing out of metallic lead and lead peroxide on the electrodes leaves an equivalent amount of free acetyl-group in the solution, accompanied by an increase in the hydrogen ion concentration; and if the solution upon entering the cells is neutral, the electrolysis throws the solution over on the acid side.

I am aware of the complex conditions that exist in solutions that contain mixtures of acetic acid and sodium acetate and although this solution is even more complex by reason of its lead, calcium and sulphate components, I shall for the sake of simplicity speak of the formation of free acetic acid in the cell as the result of the electrolysis of the lead acetate of the electrolyte. Therefore, the electrolyte upon leaving the electrolytic cells is poor in lead acetate and rich in free acetic acid.

The iron, nickel and zinc compounds above referred to as present in the solution prior to its introduction in the cell are not thrown out with the lead on the electrodes and therefore do not tend to contaminate the product.

Since the class of raw material treated by the process in the form now being described contains lead sulphate, and the solution includes sulphates, an excess of sulphates is produced in the electrolyte. I provide for reducing the sulphate and also for the removal of the metal impurities so that the solution, namely the electrolyte, may be returned to the leaching unit for reuse, and a system may therefore include the continuous circulation of the solution to perform the two important steps of leaching lead from scrap and recovering metallic lead and lead peroxide in the electrolytic cell.

I have found that if an alkaline earth oxide hydrate or carbonate, for example, a hydrate of lime, is added to the solution after it has been electrolyzed, the metal impurities mentioned and the excess sulphate will be thrown out; and that when milk of lime is added to the electrolyte at a rate equivalent to the solution of lead sulphate in the leaching unit, calcium sulphate will be precipitated out of the electrolyte continuously and the sulphate content will be maintained constant. I prefer to add the milk of lime to the electrolyte as it comes from the cells, and calcium sulphate is precipitated at once.

The precipitating agent may be adjusted to the acid character of the electrolyte for example lime stone or calcium carbonate may be used when the electrolyte has a higher acid character.

The solution is then clarified by suitable means, for example by filtering, for return to the leaching unit.

The clarified electrolyte, poor in lead and sulphate ions, may then be returned to the original container and the temperature increased, for providing the desired temperature for dissolving leady material from battery scrap. I prefer to maintain the temperature in the leaching unit 20° to 40° F. higher than the temperature of the electrolyte as it goes into the second clarification unit where the calcium sulphate is removed.

Returning now to the metallic particles deposited in the bottom of the leaching tank, the compounds in the sludge, the fragments remaining in the basket and the antimony in the sludge recovered from the first clarification unit. These are brought together and treated by heat, for example by smelting, one product being antimonial lead having substantially the percentage of antimony desired for making grids, the fragments deficient in antimony, and the antimony separated from the grids during use of the plates, being recombined.

As above stated an incidental step for increasing the proportion of metallic lead taken up by the solution in the leaching tank may be provided, for example the aeration of the grid portions and fragments during the leaching process. The oxidation of the metallic lead may be accomplished by supporting the treated fragments in the path of the solution as it comes from the heater so that the solution may pass over the fragments without immersing them.

To further facilitate the oxidation and solution of metallic lead in the leaching unit, lead peroxide or other oxidizing agent may be added, for example lead peroxide deposited on the anode.

All or part of the material produced at the anode may be transferred to the leaching unit, where it will be reduced by the metallic lead and facilitate the oxidation and solution thereof, the material thus being put in solution again, for example in case of over production of lead peroxide, use of the invention for supplying only sponge lead or metallic soft lead, and similar circumstances.

I may add galena to the solution in the leaching unit to reduce lead peroxide, for example when there is not sufficient metallic lead in the lead bearing material to reduce the peroxide returned from the anode, or when the metallic lead is required to make antimonial lead.

The preferred method above referred to for recovering a maximum amount of peroxide in the leaching unit may include the introduction of galena to the leaching tank to provide for the reduction of the peroxide with the formation of lead sulphate which is soluble in the solution.

The method of removing deposits from electrodes are well-known and I may employ any desired method for handling the deposits. I prefer to roll down the cathode deposits at regular intervals to make sure of the clinging of the sponge lead to the electrode. I will use a method for recovering the lead peroxide from the cells without interrupting the operation of the cell, including scraping of the anode, but the electrolysis must be interrupted for a few minutes each day for stripping the cathode of metallic lead.

The lead peroxide deposited at the anode, and the sponge lead deposited at the cathode in the cells, are washed in water to cleanse them from electrolyte, and may be converted by well-known processes respectively into litharge or red lead, and soft lead, lead suboxides, litharge, red lead, or basic carbonate white lead, and the value of the products will be greater than the value of similar products now obtained from similar sources because of the purity and other qualities of the deposited products.

I prefer to adapt my process including the smelting or similar step to obtain from a specified quantity by weight of battery scrap, substantially 35 per cent antimonial lead, 30 per cent sponge lead, and 30 per cent lead peroxide, the proportions varying within ranges substantially as follows: antimonial lead, 20 to 40 per cent; sponge lead, 25 to 35 per cent; lead peroxide, 25 to 35 per cent.

The residue from the second clarification tank contains an appreciable amount of the electrolyte, and I wash this residue to dilute the electrolyte therein, separate the precipitate, and evaporate the wash water to substantially the desired density for remixing with the solution, and return it to the solution.

I may also conduct the water in which the recovered sponge lead and peroxide have been washed, to the evaporator, for similar recovery of the electrolyte which had been washed from the recovered lead.

The recovery of electrolyte from the precipitate and the lead as just described and its return to the solution preserves the original proportions of constituents therein, so that the same solution may be used indefinitely, and be continuously circulated for leaching lead and serving as the electrolyte for depositing the lead on the electrodes of the cells.

In another aspect of the invention, the process described may be modified for recovering lead and lead compounds from lead bearing materials containing no sulphate, for example drosses. The solution provided for treatment of drosses would include an acetate capable of dissolving lead, the class including acetates of alkaline metals and acetates of alkaline earth metals. The alkaline earth sulphate is preferably omitted from the solution, since it is not necessary to guard against accumulation of sulphate ion.

Absence of antimony and antimony compounds, and sulphates, in the drosses being assumed, the process would consist briefly in leaching lead compounds from the lead bearing material, clarifying the compound to remove suspended particles, electrolyzing the clarified solution between insoluble electrodes to deposit metallic lead at the cathode and lead peroxide at the anode, and returning the solution to the starting point for use in leaching a further batch of material and again serving as an electrolyte for recovering metallic lead and lead peroxide. The electrodes may in this case also be stripped by any approved practice.

While I have mentioned Monel metal as a material suitable for the insoluble electrodes I may further suggest that the metals for use as anode may include Monel metal and iron chromium alloys; and that the cathodes may be made from a class of materials including copper, aluminum, Monel metal, chromium iron alloys, and sheet steel.

It is apparent that selected portions of the process may be adapted for use according to the particular characteristics of the lead bearing material, for example when the materials include antimonial lead and lead compounds excepting lead sulphate. The process above described for drosses may include the steps for removing antimony and precious metals from the solution. It may be stated that the absence of tin from the materials is assumed, in the steps described.

It is apparent therefore that I have provided a process whereby lead bearing materials may be treated electrolytically for deposit on insoluble electrodes of relatively pure metallic lead and lead peroxide, that these products so deposited are of high quality and adapted for immediate use in storage battery plates without retreatment, that a single additional treating step of reduction or transformation from the deposited to a desired form will produce a material of high quality, and that the process includes means for treating both sulphate-free materials and materials containing sulphate.

It is further apparent from my description that I have provided an electrolyte adapted to take up the lead from material to be treated and to bring about the deposition of the desired lead products on insoluble electrodes.

It is further apparent that my process provides for the continuous circulation and reuse of the electrolyte and for clarifying the electrolyte particularly to prevent the objectionable increase in sulphate ion when sulphates are included in the material.

What I claim and desire to secure by Letters Patent is:

1. The process of recovering lead from lead bearing material including treating the material with a solution capable of dissolving lead compounds and including sodium acetate, and electrolyzing the resulting solution between insoluble electrodes for recovering lead from the solution.

2. The process of recovering lead from lead bearing material including treating the material with an acetate solution capable of dissolving lead compounds and including sufficient sodium acetate to promote electrolysis, and recovering lead from the solution by electrolysis.

3. The process of recovering lead from storage battery scrap including preparing a solution including an acetate of an alkali metal, treating the materials with the solution to dissolve metallic lead and lead peroxide by local electrolysis and dissolve lead compounds as acetates, and treating the resulting solution to recover metallic lead and lead peroxide.

4. The process of recovering lead from lead bearing materials containing metallic lead and lead peroxide, including leaching the materials with a solution including acetic acid to set up local electrolysis for reducing lead peroxide, and dissolve lead as acetate, and electrolyzing the resulting solution for recovering metallic lead.

5. The process of recovering lead from lead bearing materials containing metallic lead and lead peroxide including leaching the materials with a solution including acetic acid and a preponderance of alkali-acetate to set up local electrolysis for reducing lead peroxide, and dissolve lead as acetate, and treating the resulting solution to recover a lead product therefrom.

6. The process of recovering lead from lead and lead oxide bearing material including treating the material in the presence of solid lead sulphate and calcium sulphate with a hot acetate solution including sufficient alkaline acetate to dissolve the lead oxides, and electrolyzing the resulting solution between insoluble electrodes to deposit lead peroxide on one electrode and metallic lead on the other electrode.

7. The process of recovering lead from lead sulphate bearing material, including treating the material with a solution capable of dissolving lead compounds, electrolyzing the resulting solution between insoluble electrodes for removing dissolved lead therefrom, and removing sulphate ion from the electrolyzed solution to restore the original condition of the solution.

8. The process of recovering lead from lead sulphate bearing material including dissolving the material in a solution of an alkali acetate saturated with calcium sulphate, electrolyzing the resulting solution between insoluble electrodes to deposit lead peroxide on the anode and metallic lead on the cathode, and adding calcium ion in quantity sufficient to precipitate the excess sulphate ion to recondition the solution for treating more lead sulphate bearing material.

9. The process of recovering lead from material containing impure metallic lead and lead peroxide, including treating the material with a solution including sufficient sodium acetate to induce local electrolysis for converting metallic lead and lead peroxide to lead acetates, and electrolyzing the resulting solution between insoluble electrodes to deposit lead peroxide on the anode and metallic lead on the cathode.

10. The process of recovering lead from lead bearing material containing antimony, comprising treating the material with a solution of an alkali acetate, to dissolve lead as acetate, removing the insoluble antimony compounds, and electrolyzing the solution to recover metallic lead dissolved therein.

11. The process of recovering lead from lead sulphate bearing material including dissolving the material in a solution of an alkali acetate saturated with calcium sulphate, adding an oxidizing agent to promote the solution of metallic lead, electrolyzing the resulting solution between insoluble electrodes to deposit lead peroxide on the anode and metallic lead on the cathode, and adding calcium ion in quantity sufficient to precipitate the excess sulphate ion to recondition the solution for treating more lead sulphate bearing material.

12. The process of recovering lead from lead bearing material containing metallic lead and lead peroxide, comprising treating the material with a solution of sodium acetate saturated with calcium sulphate to allow a local electrolytic action between the lead peroxide and the metallic lead to render both soluble, leaching the treated material with the same solution to dissolve soluble lead compounds, electrolyzing the resulting solution between insoluble electrodes to recover metallic lead on the cathode and lead peroxide on the anode, and adding calcium ion in quantity sufficient to precipitate the excess sulphate ion to condition the solution for reuse in leaching more material.

13. The process of recovering lead from materials including metallic lead, lead oxide and lead sulphate, comprising treating the materials with a solution including sufficient acetate to dissolve lead compounds, removing the lead from the solution by electrolysis, and treating the electrolyzed solution with sufficient calcium ion to restore the original condition of the solution.

14. The process of recovering lead from battery scrap including metallic lead, lead oxides and lead sulphate, comprising treating the scrap with a solution including sufficient acetate to dissolve lead compounds, electrolyzing the resulting solution between insoluble electrodes to deposit metallic lead at the cathode and lead peroxide at the anode, and treating the electrolyzed solution with sufficient lime to restore the original condition of the solution.

15. The process of recovering lead from battery scrap including metallic lead, lead oxides and lead sulphate, comprising treating the scrap with a solution containing acetate in quantity sufficient to dissolve soluble lead compounds for forming a lead-bearing electrolyte, electrolyzing the resulting solution between insoluble electrodes to deposit metallic lead at the cathode and lead peroxide at the anode, and treating the electrolyzed solution with sufficient lime stone to restore the original condition of the solution.

16. The process of preparing battery scrap for reuse consisting of leaching out the old active material from the scrap with a solvent including an acetate in quantity sufficient to dissolve the lead compounds to acetates, and adapted to suspend antimony compounds, clarifying the solution to remove antimony, and electrolyzing the solution containing the lead acetates between insoluble electrodes to recover lead peroxide on the anode and metallic lead on the cathode.

17. The process of recovering materials from battery scrap comprising leaching the scrap in a solution containing sufficient sodium acetate to dissolve soluble oxides and sulphates of the scrap and produce local electrolytic action between the metallic lead fragments and lead peroxide for reducing the peroxide for dissolution, filtering the solution to recover insoluble antimony compounds, passing the solution over a quantity of sponge lead sufficient to remove copper and precious metals therefrom, electrolyzing the solution between insoluble electrodes for depositing metallic lead on the cathode and lead peroxide on the anode, adding sufficient calicum hydrate to precipitate the excess sulphate ion as calcium sulphate, removing the precipitate to condition the solution for reuse as a leaching agent, heating the reconditioned solution, and employing the same for leaching another batch of battery scrap.

18. The process of recovering lead from lead sulphate bearing material comprising treating the material with a solution including an alkaline earth acetate in quantity sufficient to dissolve lead sulphate, electrolyzing the resulting solution between insoluble electrodes to deposit metallic lead on the cathode and lead peroxide on the anode, and treating the electrolyzed solution with lime to remove the excess sulphate ion and recondition the solution for treating lead sulphate bearing material.

19. The process of producing battery plate material from battery scrap comprising treating the scrap with a solution containing sufficient sodium acetate to dissolve lead compounds, electrolyzing the solution between insoluble electrodes to deposit sponge lead on the cathode and lead peroxide on the anode, adding sufficient lime to reduce the sulphate ion content of the solution, filtering the solution, and heating the solution for reuse as a treating agent.

20. The process of recovering soft metallic lead from battery scrap including treating the scrap with a solution containing an alkali acetate to produce a local electrolytic action between the metallic lead of the scrap and lead peroxide to render both soluble and to dissolve the soluble lead compounds of the scrap, filtering the solution to recover insoluble antimony compounds, electrolyzing the filtered solution between insoluble electrodes to deposit soft metallic lead on the cathode and lead peroxide on the anode, adding calcium ion to precipitate the excess sulphate ion as calcium sulphate, removing the precipitate to condition the solution for reuse as a leaching agent, returning the solution for leaching another batch of battery scrap, and returning lead peroxide deposited on the anode to the solution for electrolytic action with metallic lead of the scrap to render the metallic lead soluble.

21. The process of recovering lead from battery scrap comprising leaching the battery scrap with a solution capable of dissolving the oxides and sulphates of lead of the scrap, adding sufficient galena to reduce and render soluble the lead peroxide of the scrap, electrolyzing the resulting solution to recover lead therefrom, adding calcium ion to precipitate excess sulphate ion as calcium sulphate, and removing calcium sulphate from the solution to recondition the solution for reuse.

22. The process of recovering material from battery scrap comprising leaching the battery scrap with a solution containing sufficient sodium acetate to dissolve the soluble oxides and sulphates of the scrap, adding sufficient galena to reduce and render soluble the lead peroxide of the scrap, electrolyzing the solution between insoluble electrodes for depositing metallic lead on the cathode and lead peroxide on the anode, adding sufficient calcium ion to precipitate excess sulphate ion as calcium sulphate, removing the calcium sulphate from the solution, and returning the solution for leaching another batch of battery scrap.

23. The process of recovering metallic lead from lead bearing materials comprising leaching the material with a solution of an alkali acetate, electrolyzing the solution between insoluble electrodes for depositing metallic lead on the cathode and lead peroxide on the anode, adding calcium ion to remove excess sulphate from the solution as calcium sulphate, returning the solution together with the lead peroxide deposited on the anode and sufficient galena to reduce it, to be combined with additional lead bearing material for the preparation of the solution for electrolyzing.

24. The process of recovering lead from lead and lead oxide bearing material including treating the material with a sufficiently strong acetate solution including sodium acetate to set up local electrolysis and promote dissolution of compound products of local electrolysis, and removing lead from the solution.

25. The process of recovering lead from materials containing metallic lead and a lead compound, including treating the material with a solution including an electrolyte capable of effecting local electrolytic action between said lead and said compound, clarifying the solution, and treating the solution to recover lead.

26. The process of recovering lead from lead bearing material containing antimony compounds, including leaching the material with a hot solution containing sodium acetate to dissolve the lead and leave antimony compounds undissolved, separating said antimony compounds from the solution, and treating the solution to recover the lead.

27. In a process of the character described including recovery of dissolved lead from a solution containing sulphate ion, the steps of dissolving material containing lead sulphate with a solvent including sodium acetate in relatively high concentration to provide the solution, adding calcium ion to the solution to precipitate excess sulphate ion, and removing calcium sulphate from the solution.

28. The process of recovering lead from lead sulphate bearing material, including treating the material with a solvent including an alkali acetate to dissolve the lead sulphate, separating lead from the solution, and treating the solution to remove sulphate ion therefrom for reuse for dissolving fresh material.

29. The process of recovering lead from material containing lead compounds including sulphate, including treating the material with an acetate solution including sodium acetate for dissolving lead compounds including sulphates, recovering a lead compound from the solution, treating the solution with calcium ion to precipitate excess sulphate ion as calcium sulphate, and removing calcium sulphate from the solution to recondition the solution for reuse.

In testimony whereof I affix my signature.

JOHN H. CALBECK.